United States Patent [19]
Mackrle et al.

[11] 4,390,422
[45] Jun. 28, 1983

[54] APPARATUS FOR THE BIOLOGICAL PURIFICATION OF WATER

[75] Inventors: Svatopluk Mackrle, Brno; Vladimír Mackrle, Prague; Oldrich Dracka, Brno, all of Czechoslovakia

[73] Assignee: Agrotechnika, narodni podnik, Zvolen, Czechoslovakia

[21] Appl. No.: 48,813

[22] Filed: Jun. 15, 1979

[30] Foreign Application Priority Data

Jun. 15, 1978 [CS] Czechoslovakia .................... 3924-78

[51] Int. Cl.³ .................... B01D 19/00; C02F 3/22
[52] U.S. Cl. .................... 210/188; 210/195.4; 210/202; 210/218; 210/220
[58] Field of Search .................... 210/14, 15, 60, 63 R, 210/151, 188, 194, 195.4, 202, 218, 220, 261

[56] References Cited

U.S. PATENT DOCUMENTS

| | | | |
|---|---|---|---|
| 1,139,024 | 5/1915 | Frank | 210/202 X |
| 2,597,802 | 5/1952 | Kappe | 210/221 R X |
| 3,003,580 | 10/1961 | Lanning | 210/188 X |
| 3,182,801 | 5/1965 | Griffith | 210/15 X |
| 3,339,741 | 9/1967 | Bernard et al. | 210/195.4 |
| 3,507,393 | 4/1970 | Weis et al. | 210/195.4 |
| 3,804,255 | 4/1974 | Speece | 210/194 |
| 4,054,524 | 10/1977 | Mackrle et al. | 210/220 X |

FOREIGN PATENT DOCUMENTS

| | | | |
|---|---|---|---|
| 368433 | 5/1963 | Switzerland | 210/220 |
| 592759 | 2/1978 | U.S.S.R. | 210/195.4 |

*Primary Examiner*—Robert H. Spitzer

[57] ABSTRACT

Apparatus for the biological purification of water with the separation of activated sludge by fluid filtration with the spontaneous returning of activated sludge into the activation area or zone, said separation area or zone being arranged above the activation area.

4 Claims, 1 Drawing Figure

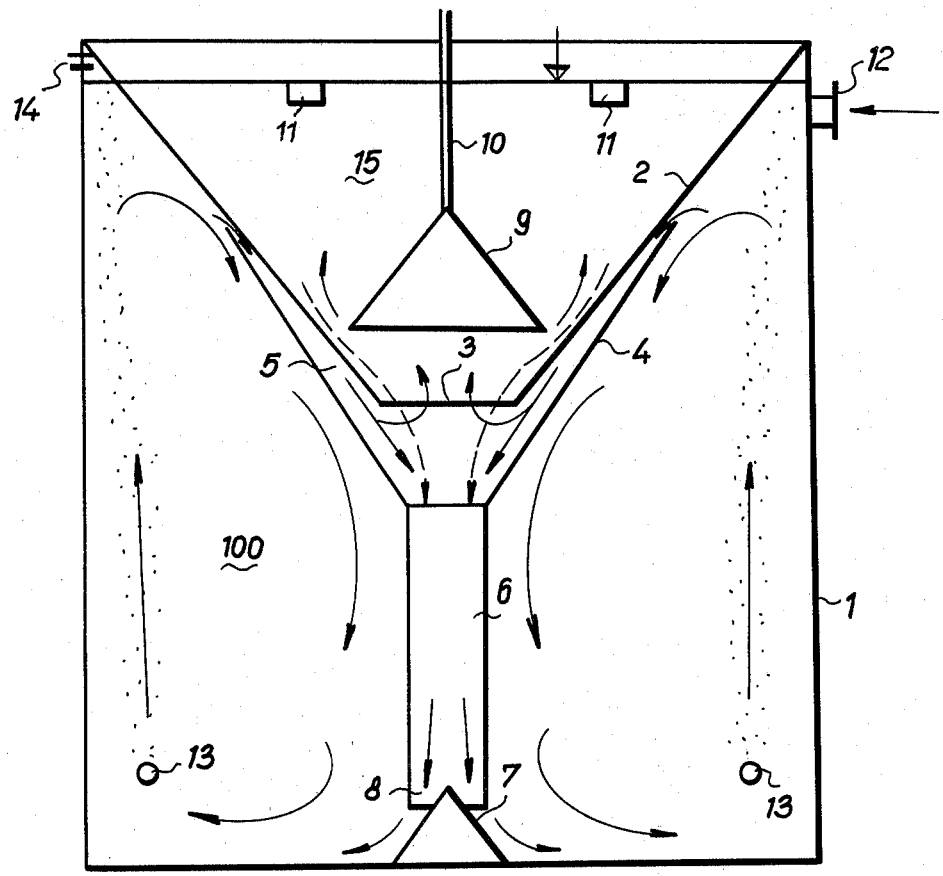

APPARATUS FOR THE BIOLOGICAL PURIFICATION OF WATER

The present invention relates to an apparatus for the biological purification of water with the separation of activated sludge by fluid filtration with the spontaneous returning of activated sludge into the activation area, the separation area arranged above the activation area.

The biological purification of water is performed by means of aerobic activation by urging air or oxygen into the water, followed by the separation of activated sludge wherein the activated sludge is separated from clarified water and returned back into the activation area. The up-to-date installations have both the separation area and the activation area integrated in one common tank. The most suitable separation for these units appears to be that in which the fluid filtration with activated sludge returns spontaneously into the activation. The separation area is arranged next to the activation area and can be located either side by side or above the activation area and is always connected with it by means of orifices for the inlet of water with activated sludge and for the returning of activated sludge.

During fluid filtration, water in the separation area streams substantially upwards and consequently, the orifices for the inlet of activated sludge are always arranged in the bottom of the separation area in cases in which this type of separation is used. If, accordingly, the separation area is located side by side at the activation area, the orifice for the inlet of water with activated sludge into the separation is located in the bottom part of the activation area. If, however, the separation area is disposed above the activation area, such orifice is located in the upper part of the activation area.

The arrangement of the separation area above the activation area offers advantages as compared with the arrangement of such areas side by side, particularly as concerns simpler design, better utilization of the surface, and more convenient shapes of the apparatus from the viewpoint of its transportation.

Operational experience, however, shows the unfavorable effects of the flotation of activated sludge in the separation area. On the one hand, such flotation impairs the effectiveness of separation, and on the other hand it forms a layer of flotated sludge upon the surface of separation. The layer of flotated sludge hampers the operation of the unit by blocking the removal of clarified water from the separation area. The gradual blocking of this outlet causes an uneven distribution of water flow in the separation area, which is another cause of the deterioration of the separating effectiveness of separation.

It has been further noted that the intensity of such unfavorable effect also depends upon the concentration of suspended solids in the water to be purified. In the case of organic feculent waters, a markedly deteriorated quality of clarified water, having a 5-times higher $BSK_5$ average, has been noted due to this effect, as compared with the quality of water purified by other suitable means. In concentrated sewage, the above unfavorable effect can increase to the extent of causing the operation to break down. The described disadvantages can be so pronounced as to set practical limits to the use of installations with the separation area above the activation area.

The above disadvantages are eliminated by the apparatus according to the present invention in which a bubble trap forming a cavity opened downwards is arranged above the passage for the transition of water from the activation area into the separation area. In a preferred embodiment the cavity of the bubble trap broadens in the downward direction.

A further feature of the invention, which is particularly suitable for use in units of increased height, as well as for the purification of concentrated sewage, resides in that the activation area has a connecting channel linked up with the lower edge of the wall under said passage, said channel being oriented downwardly and having its lower end discharging into the lower part of the activation area.

Another feature of the invention resides in that a guide element is arranged under the mouth of the connecting channel, said guide element consisting of skew walls creating a slot between themselves and the discharge mouth of said connecting channel.

In the case of a more complex system in the area of the inlet of water into the separation area, as a rule the passage allowing the upward flow of water with activated sludge is considered as the above-mentioned passage for the transition of water with activated sludge from the activation to the separation, and directly at this passage the downward flow direction is turned upwardly.

In the accompanying drawing the single FIGURE is a diagrammatic cross-sectional view of a preferred embodiment of the apparatus of this invention.

In a vertical cylindrical tank 1, a funnel shaped partition 2 forms the activating area or zone 100 and above it the separation area or zone 15. The activating area 100 communicates with the separation area 15 by means of a passage 3 for the transition of water from the activation area 100 into the separation area 15.

The funnel shaped wall 4 under the partition 2 is fixed to brackets (not shown) on either the partition 2 or the wall of tank 1. The partition 2 and the wall 4 create a ring channel 5 discharging at its lower end into a connecting conduit or channel 6 oriented in the direction of flow within the activation area 100 at its location. The connecting channel 6 extends down to the bottom part of the activation area 100. Under the lower, discharge end of the connecting channel 6 and spaced therefrom there is arranged a conical guide element 7 which is disposed coaxial of channel 6. Between the walls of the guide element 7 and the mouth of the connecting channel 6 there is formed a slot 8 which spouts an inclined stream of water from the channel 6 down to the bottom of the activation area 100.

Passage 3 is defined as a passage allowing the upward flow of water with activated sludge, while the downward direction stream of the water in ring channel 5 is turned upwardly directly at passage 6. Over the passage 3 for the transition of water from the activation area 100 to the separation area 15 there is inserted a bubble trap 9 into the separation area 15, said bubble trap 9 forming a cavity which is preferably open at the bottom, with the lower brim of the bubble trap overlapping or projecting horizontally beyond the perpendicular projection of the passage 3. The bubble trap 9 is arranged so as to allow water to stream upwardly along its lower edge; the upper end of the bubble trap is connected to a pipe 10 which constitutes an outlet 10 for trapped air leading outside the separation area 15.

The separation area 15 is provided with a collecting flume 11 for discharging the clarified water; in the upper part of the tank 1 there is arranged an inlet 12 through which the water to be treated enters the activation area 100. The activation area 100 is provided with a pneumatic aeration system consisting of aerating elements 13. An air outlet 14 is arranged above the surface of the activation area 100.

The described apparatus operates as follows:

Water to be treated enters the inlet 12 of the activation area 100 where it becomes mixed with activated sludge. The aerating elements 13 serve to urge air into the activation area 100, yielding, on the one hand, oxygen required for the biologic processes of water purification and, on the other hand, the necessary streaming and turbulence within the activation area 100 indispensable for the said mixing and for maintaining the mixture of activated sludge. The air bubbles, which become partially deprived of oxygen, escape into the environment at the upper part of the activating area through the air outlet 14. During the flow of water through the activation area 100 some water with activated sludge is removed from the passage 3 and brought to the separation area 15 where the activated sludge is retained. The water from which activated sludge has been removed is then drained by the collecting flume 11 in the upper part of the separation area 15. The activated sludge retained in the separation area 15 automatically returns into the activation area 100 through the passage 3.

The air bubbles penetrating through the passage 3 are caught at the oblique wall of the bubble trap 9 after passing through passage 3. Whereas both water and sludge stream along the lower edge of the wall of the bubble trap 9, the trapped air bubbles proceed to the upper part of the trap 9, from which they are discharged into the environment through pipe 10. The wall 4 under the partition 2 arranged in the activation area 100 in the direction of flow lines prevents the air bubbles rising upwardly within the activation area 100 from direct penetrating into the passage 3, thus reducing the amount of bubbles travelling through the passage 3, and consequently improving the operation of the air trap 9 above the passage 3. The bubbles that have penetrated into the passage 3 in spite of that can trace their origin to the bubbles which are dragged away from the wall of the tank 1 by streaming and which are gathered during the flow of the liquid in the ring channel 5.

The arrangement of the connecting channel 6 prevents the bubbles carried away by the downward stream of the liquid in the central region of the activation area 100 from penetrating into the area under the passage 3; this prevents the bubbles from entering the separation area 15, particularly in the case of highly concentrated and intensely aerated sewage, and also in the case of purifying plants or installations of considerable height.

The above operation provides an effective protection against bubbles entering the separation area 15. From the above it can be seen that this penetration of bubbles and their agglomeration with the activated sludge in the separation area 15 is the cause of the flotation of activated sludge in the separation area 15. Consequently, the prevention of bubbles from entering the separation area 15 eliminates the unwanted flotation of sludge within the separation area 15.

The described apparatus offers various advantages. The elimination of the flotation of sludge in the separation area approves the effectiveness of separation to the extent of achieving substantially better quality of water leaving the apparatus. Also, sewage waters with high concentrations of suspended solids can be treated without any problems. Purifying plants can be used having the separation area above the activation area, which offers advantages in numerous cases, especially as concerns the cost of construction and the area necessary for the construction of the purifying plant.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. In an apparatus for the biological purification of water with the separation of activated sludge by fluid filtration with the spontaneous returning of activated sludge into the activation area, said apparatus having a tank containing the activation area and the separation area, said separation area being arranged above the activation area, means for aerating the sludge in the activation area, means for escape of the used air from the activation area, and means providing a passage for conducting water with activated sludge from the activation area into the separation area, said passage being defined as a passage where downwards directed stream of water is turned upwards into the separation area, the improvement which comprises a bubble trap having a cavity, the lower end of which is open downwardly, said bubble trap being arranged above the upper end of the passage for the transition of water with activated sludge from the activation area into the separation area, the downwardly open lower end of the bubble trap horizontally overlapping the perpendicular projection of said passage, and means providing for the discharge of air from the upper part of the cavity in the bubble trap.

2. An apparatus as claimed in claim 1, comprising means providing an at least generally vertical channel in the activation area, the lower end of said channel extending and discharging into a lower part of the activation area, the upper end of said channel being situated beneath the passage for the transition of water with activated sludge from the activation area into the separation area and a downwardly directed stream of water with activated sludge to said passage.

3. An apparatus as claimed in claim 2, comprising a guide element in the activating area disposed beneath the lower end of the channel, said guide element having inclined walls spaced from the lower end of the channel to provide a slot therebetween for the discharge of water therefrom into the lower part of the activating area.

4. An apparatus as claimed in claim 1, wherein the cavity of the bubble trap broadens in the downward direction.

* * * * *